Dec. 2, 1969   E. W. OAKES   3,481,041
SURFACE PROFILE METHOD
Filed Nov. 16, 1966
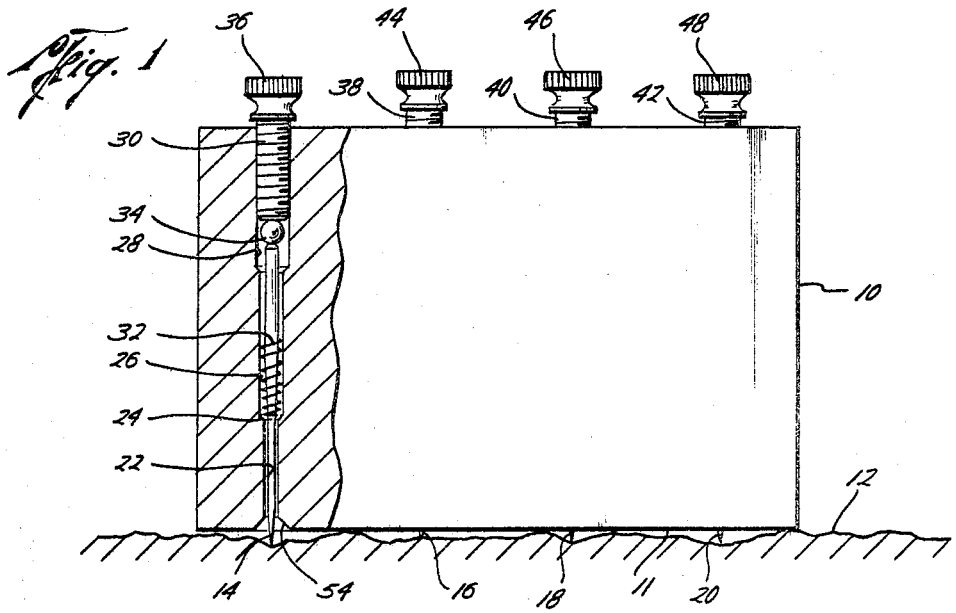
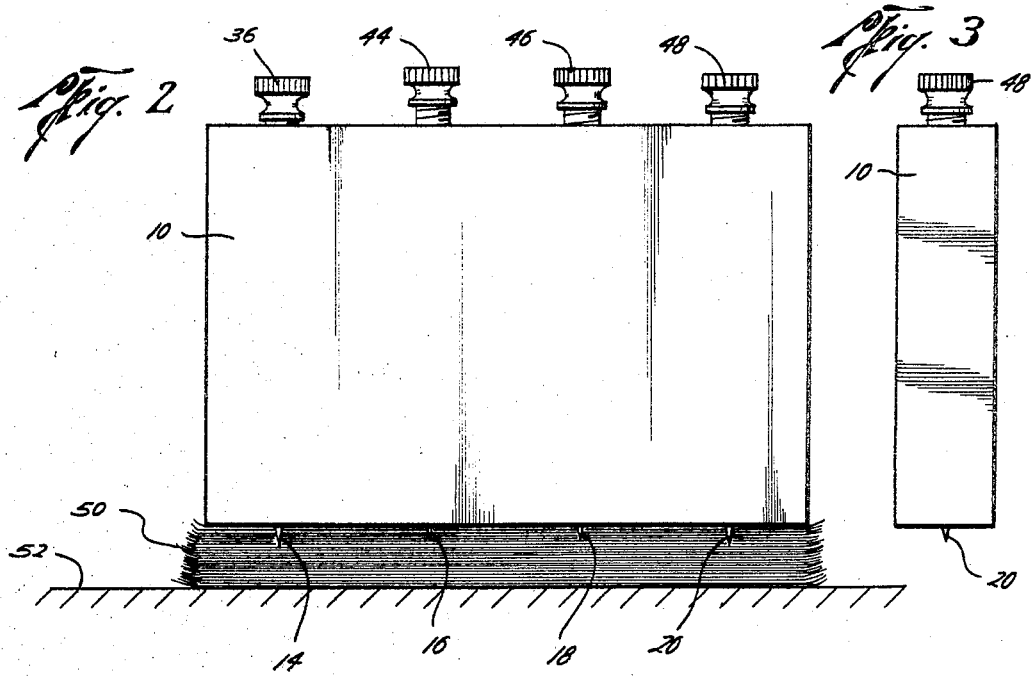
Edward W. Oakes
INVENTOR.
BY
ATTORNEYS

United States Patent Office 3,481,041
Patented Dec. 2, 1969

3,481,041
SURFACE PROFILE METHOD
Edward W. Oakes, 6443 Jefferson Drive,
Houston, Tex. 77023
Filed Nov. 16, 1966, Ser. No. 594,856
Int. Cl. G01b *3/22, 5/00;* G03b *1/64*
U.S. Cl. 33—170
4 Claims

ABSTRACT OF THE DISCLOSURE

The method and apparatus for determining the depth of surface irregularities including positioning a plurality of needles in a block so that the needle points extending from the block contact the surface, moving the block into a stack of paper and determining the number of sheets of paper penetrated by each needle, thus providing a measure of the depth of the surface points contacted by the needle points.

---

The present invention is directed to a method of determining the depth of surface irregularities.

The surface profile, i.e., the peak to valley depth of surface irregularities, may be used in determining the amount of paint or surface coating which should be used on the surface for proper coverage. When such surface profile is not accurately determined, the surface coverage may be either insufficient or substantially more expensive than necessary. To obtain accurate measurements of the surface profile, the depth of the valleys must be given proper attention since many measuring devices do not penetrate to the lowest portion of the valleys.

It is therefore an object of the present invention to provide an improved method of determining the depth of surface irregularities.

A still further object is to provide an improved method of measuring surface profile with small needles in which the position of the needles engaging the surface is used to penetrate a stack of paper with the depth of such penetration being the measure of the surface profile.

Another object is to provide an improved method of measuring pitting in a surface in which inaccuracies, normally encountered from apparatus wear, are minimized.

These and other objects and advantages are hereinafter clearly set forth and explained with reference to the preferred form of the invention illustrated in the drawings wherein:

FIGURE 1 is an elevation view of the apparatus of the present invention positioned on a surface and to measure the surface profile with a portion of the apparatus broken away to illustrate the details of structure.

FIGURE 2 is another elevation view of the apparatus with the needles penetrating into a stack of paper sheets.

FIGURE 3 is an end elevation of the apparatus illustrated in FIGURES 1 and 2.

Many devices have been used in an attempt to obtain an accurate measurement of a surface profile, particularly of surfaces which have been prepared for painting or coating. Some of the devices have utilized surface engaging elements which when passed over the surface, generally provide an average trace of the surface. Such elements since they trace over the surface must of necessity be substantial in size to avoid being damaged or worn. This size limitation is therefore a limitation on the accuracy of the device. Obviously, a relatively large diameter element does not penetrate to the bottom of a valley, particularly where the valley is relatively small in a transverse direction.

The present invention provides a surface profile method in which the wear of the parts and the relatively small dimensions of the valleys in the surface do not affect the accuracy of determining the surface profile.

Referring more in detail to the drawings:

In FIGURE 1 the block body 10 is shown with its lower surface 11 resting on the surface 12, whose profile is to be determined. Surface 11 of body 10 is substantially flat. As shown, four surface engaging elements or needles 14, 16, 18 and 20 are provided projecting from the surface 11 of body 10. Each of the needles is separately adjustable and may be lowered in the body 10 until its tip is in engagement with the surface 12. Without further adjustment, the needles when so adjusted, remain in such position until positively moved.

The actuation of the needles is best seen from the broken portion of the body 10 on the left side of FIGURE 1. The body 10 defines a bore 22 normal to surface 11 which is slightly larger than the diameter of the lower portion of the needle 14 so that the needle is free to move longitudinally in such bore. The bore 22 terminates in the upwardly facing shoulder 24 which defines the lower end of the intermediate bore 26. The needle 14 extends through bore 26 and into the enlarged bore 28. The enlarged bore 28 is threaded to receive the screw 30.

As shown, the needle 14 is positioned extending through the bores 22 and 26 and partly into the bore 28. The spring 32 surrounds the lower portion of needle 14 and urges the needle 14 upwardly in the bores 22, 26 and 28. The spring 32 is tightly engaged on the exterior of the needle 14 within the bore 26 and engages the shoulder 24 at its other end. The bearing 34, which, as shown, is a ball, is positioned within bore 28 between the upper end of the needle 14 and the lower end of the screw 30 to assure that the rotation of the screw 30 is transmitted to the needle 14 only as a longitudinal movement. The outer end of screw 30 is provided with the knob 36 for ease of rotation.

Each of the needles 16, 18 and 20 is similarly installed in the body 10 and is operated by the screws 38, 40 and 42, respectively, by their knobs 44, 46 and 48. Also, each of the needles is provided with a means which urges the needles upwardly toward the screws, so that when the screws are rotated to move upwardly, the needles move upwardly and thereby retract their points. It has been found that sewing machine needles having a fine tapered point may be used for the surface engaging elements or needles shown.

In operation, the block 10 with all of the needles fully retracted therein, is placed on the surface 12 whose profile is to be determined with the surface 11 in contact with the peaks or high spots of the surface 12. Thereafter, each of the knobs 36, 44, 46 and 48 are separately adjusted to move the points of the needles into contact with the surface 12. The knobs should be turned lightly to assure that the needles are moved into contact with the surface 12. Care should be taken in adjusting the knobs to assure that the needle points are not moved further outward after light contact is made with surface 12.

After all of the needles have been so adjusted, the block 10 is moved to position its side 11 on top of the stack 50 of thin paper sheets. The stack 50 is resting on the surface 52 which is substantially flat. The block 10 is then urged downward onto the stack 50, causing the needles to penetrate through the paper to a depth directly equal to the extension of the needles beyond the surface 11 of block 10. Sufficient force is used to urge the block 10 down on the stack 50 to assure that the paper sheets ahe pressed flat. It is sometimes helpful, particularly where the needle points are very sharp, to slide the block 10 transversely of the stack 50 to scratch the paper sheets rather than merely penetrate such sheets. This avoids the difficulty of determining the last few sheets of paper penetrated by the needles. The opening of bore 22 is enlarged as at 54 to prevent fragments of paper from the scratching of the paper stack from entering bore 22.

Actual measurement of the surface profile is obtained from the needle penetration. The number of sheets penetrated by each needed may be measured for thickness with a micrometer or if the thickness of each sheet is known, then the number of sheets penetrated are counted and their total thickness computed. Such measurements are the depths to which the needles extend below the surface peaks engaged by the surface 11 to contact the valleys as shown.

It is preferred that relatively thin sheets of paper be used in the stack 50. Particularly it is advantageous to use a type of paper which does not compress extensively. A typical example of suitable paper has been found to be cigarette papers, such as those for "roll-your-own" cigarettes. These cigarette papers are relatively thin and when engaged by the block 10, are compressed without any appreciable air trapped between sheets so that the penetration of the needles into the stack and the measurement of the number of sheets penetrated will be a very accurate measurement of the depth of the valleys below the peaks. If the number of sheets penetrated are actually measured with the micrometer, the same degree of compression of the sheets of paper should be provided by the micrometer as that provided by the block 10 when it is placed on the stack 50.

From the foregoing, it can be seen that the present invention provides an improved method for determining surface profile in which the accuracy is maintained even though the device may be subject to wear and allows the use of very sharply tapered surface engaging elements or needles.

What is claimed is:

1. The method of measuring the depth of surface irregularities with a block having at least one needle movable to extend beyond one side of the block, including the steps of,
positioning said one side of the block on the surface to be measured,
moving the needle with respect to said block into contact with said surface,
positioning said block with said one side on a stack of sheets of thin paper with said needle penetrating the paper to a depth beyond the block on said one side, and
determining the number of said sheets of paper through which said needle penetrates as a measure of the depth of the point of contact of said needle on said surface below the plane of contact between said surface and said block.

2. The method according to claim 1, including holding said needle in the position of its contact with said respect to said block, while it is penetrating said stack of sheets of paper.

3. The method according to claim 1, wherein said block includes a plurality of movable needles and including the steps of,
moving each needle in said block into contact with said surface whereby each needle in said block penetrates the paper sheet stack to a depth which is the exact distance between said one side of said block and said surface.

4. The method according to claim 1, including the step of,
measuring the thickness of the sheets of paper through which said needle has penetrated to determine the depth of the surface engaged below the level of the peaks of said surface.

References Cited

UNITED STATES PATENTS

| | | |
|---|---|---|
| 2,780,005 | 2/1957 | Finney et al. |
| 3,029,522 | 4/1962 | Stolle _____ 73—105 X |
| 3,061,937 | 11/1962 | Aviles et al. |
| 3,171,211 | 3/1965 | Parkes et al. _____ 33—170 |

FOREIGN PATENTS

| | | |
|---|---|---|
| 840,985 | 7/1960 | Great Britain. |
| 30,101 | 10/1919 | Norway. |
| 74,645 | 3/1917 | Switzerland. |

ROBERT B. HULL, Primary Examiner

U.S. Cl. X.R.
33—174; 73—105